US012488711B1

(12) United States Patent
Hussain et al.

(10) Patent No.: US 12,488,711 B1
(45) Date of Patent: Dec. 2, 2025

(54) PARKING DEVICE

(71) Applicant: PRINCE MOHAMMAD BIN FAHD UNIVERSITY, Dhahran (SA)

(72) Inventors: Ahmed Abul Hussain, Dhahran (SA); Naif M. Jan, Dhahran (SA); Samir El-Nakla, Dhahran (SA); Mustafa Al-Salem, Dhahran (SA); Hamad Al-Dossary, Dhahran (SA); Hussain Al-Silham, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/279,796

(22) Filed: Jul. 24, 2025

(51) Int. Cl.
| | |
|---|---|
| *G09F 13/04* | (2006.01) |
| *G01S 17/08* | (2006.01) |
| *G06Q 10/02* | (2012.01) |
| *G06V 20/62* | (2022.01) |
| *G08G 1/14* | (2006.01) |
| *G09F 27/00* | (2006.01) |

(52) U.S. Cl.
CPC .......... *G09F 13/0472* (2021.05); *G01S 17/08* (2013.01); *G06Q 10/02* (2013.01); *G06V 20/625* (2022.01); *G08G 1/144* (2013.01); *G08G 1/146* (2013.01); *G09F 27/005* (2013.01)

(58) Field of Classification Search
CPC .... G09F 13/0472; G09F 27/005; G01S 17/18; G06Q 10/02; G06V 20/625; G08G 1/144; G08G 1/146
See application file for complete search history.

(56) References Cited

U.S. PATENT DOCUMENTS

| | | | | |
|---|---|---|---|---|
| 10,055,990 | B2* | 8/2018 | Krivacic | G08G 1/14 |
| 12,424,095 | B2* | 9/2025 | Sugano | G08G 1/145 |
| 2008/0165030 | A1* | 7/2008 | Kuo | G08G 1/14 |
| | | | | 340/932.2 |
| 2019/0228659 | A1* | 7/2019 | Papineau | G08G 1/04 |
| 2020/0175868 | A1* | 6/2020 | Reisbick | G08G 1/142 |
| 2020/0234593 | A1* | 7/2020 | Mergenthaler | G08G 1/0116 |
| 2020/0312144 | A1* | 10/2020 | Noguchi | G08G 1/143 |

(Continued)

FOREIGN PATENT DOCUMENTS

| | | |
|---|---|---|
| CN | 215182468 U | 12/2021 |
| CN | 217133848 U | 8/2022 |

(Continued)

*Primary Examiner* — Gary C Hoge
(74) *Attorney, Agent, or Firm* — Oblon, McClelland, Maier & Neustadt, L.L.P.

(57) ABSTRACT

A T-shaped parking device module having a two-tiered rectangular base, a first support having a cuboid perpendicular to the base, and a second support having a cuboid perpendicular to the first support forming a T-shape. The first support has width X, with both supports having thickness of 0.1×X to 0.25×X. The front side of the second support contains a camera and sound device at center position, LiDAR sensors at first and second ends, a lamp on the first end, and battery and wireless communication node on the second end. A liquid crystal display in a right trapezoidal prism casing is positioned on top of the first end. The device enables simultaneous monitoring of multiple parking spaces through coordinated sensor arrays and wireless communication for comprehensive parking management.

18 Claims, 13 Drawing Sheets

(56) References Cited

U.S. PATENT DOCUMENTS

2023/0391216 A1* 12/2023 Salter .................. G08G 1/149
2024/0362886 A1* 10/2024 Jung ................... G06V 20/58

FOREIGN PATENT DOCUMENTS

| CN | 219778340 U | 9/2023 |
| JP | 2022-104523 A | 7/2022 |
| TW | 202147259 A | 12/2021 |

* cited by examiner

PARKING DEVICE

BACKGROUND

Technical Field

The present disclosure relates to parking management systems. More particularly, the present disclosure relates to Internet of Things devices for vehicle monitoring and wireless sensor networks for urban infrastructure monitoring and management.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Rapid urbanization has intensified strain on existing parking infrastructure in urban areas worldwide. Traditional parking systems typically lack real-time monitoring capabilities, leading to user frustration and exacerbating traffic congestion in urban environments. These traditional parking management approaches rely on manual monitoring methods that require significant human intervention and oversight. Such manual processes often result in inefficient utilization of available parking spaces and create challenges for both parking administrators and users seeking available parking locations.

Further, current parking systems typically lack real-time availability information, making it difficult for users to locate available parking spaces efficiently. Limited scalability and high infrastructure costs associated with traditional parking monitoring systems also prevent widespread implementation across large parking facilities. Furthermore, there is an environmental impact from vehicle idling while searching for parking spaces due to increased emissions, as a side-effect, which contributes to urban air quality degradation. These problems result in wasted time, increased fuel consumption, and elevated stress levels for drivers attempting to locate parking spaces.

Known conventional solutions include basic sensor-based systems that provide limited monitoring capabilities for individual parking spaces. Fixed monitoring infrastructure systems require permanent installation and substantial upfront investment costs. Such separate reservation and monitoring systems operate independently without integration, creating fragmented user experiences. Limited violation detection capabilities in existing systems fail to address improper parking behaviors and unauthorized vehicle access. These conventional solutions typically focus on single-function operations rather than comprehensive parking management integration.

Further, existing solutions have high installation costs that make widespread deployment economically challenging for many parking facility operators. Limited portability and scalability prevent flexible deployment across different parking environments and configurations. Lack of integrated violation detection capabilities results in incomplete monitoring of parking compliance and security. Poor user experience and limited real-time updates create frustration and inefficiency for parking facility users. These limitations highlight the need for more comprehensive and integrated parking management solutions.

Previous parking modules suffer from one or more drawbacks hindering their adoption, such as requiring multiple separate devices for comprehensive parking monitoring, lacking integrated violation detection and alert systems, providing limited portability and scalability for diverse deployment scenarios, and failing to provide coordinated multi-space monitoring capabilities through a single modular device. These limitations result in increased installation costs, complex system integration requirements, and reduced operational efficiency for parking facility management. The existing solutions typically focus on single-function operations or require extensive infrastructure modifications for deployment. Additionally, conventional systems often lack the flexibility to adapt to changing parking configurations and fail to provide comprehensive user interaction capabilities through integrated display and communication systems. Accordingly, it is one object of the present disclosure to provide an integrated, portable, and cost-effective solution with integrated sensing, communication, and display capabilities that enables simultaneous monitoring of multiple parking spaces while maintaining portability and cost-effectiveness for widespread deployment across various parking environments.

SUMMARY

In an exemplary embodiment, a parking device is described, comprising a T-shaped module, comprising a two-tiered rectangular base, a first support comprising a cuboid that is perpendicular to the base, and a second support comprising a cuboid that is perpendicular to the first support such that the first and second support form a T-shape, wherein the first support has a width equal to X, and the first and second support have a thickness of $0.1 \times X$ to $0.25 \times X$, wherein the T-shape has a front side and a back side, wherein the front side of the second support contains, a camera and a sound device at a center position, a LiDAR sensor at a first end and a second end, a lamp and LED on the first end, and a battery and wireless communication node on the second end, wherein a liquid crystal display disposed in a casing having a right trapezoidal prism shape having a thickness that is the same as the thickness of the second support is present on top of the first end of the second support, wherein a straight edge of the right trapezoidal prism is aligned with an upper edge of the first end of the second support such that the casing edge and the upper edge of the second support are flush, and an angled edge of the right trapezoidal prism shape is pointed towards the second end of the second support.

In some embodiments, the camera is configured to capture an image of the license plate of a vehicle, wherein the processor includes circuitry configured with instructions to identify and record a license plate number.

In some embodiments, the parking device includes circuitry configured with instructions to wirelessly send the license plate number to user device.

In some embodiments, the LiDAR sensor detects a distance between a vehicle and the parking device wherein the processor includes circuitry configured with instructions to identify an angle and a distance from the parking device at which a vehicle is parked and determine if the angle and the distance is within a set parameter.

In some embodiments, the processing circuitry is configured with instructions to activate the lamp and LED if the angle and the distance is outside the set parameter.

In some embodiments, the processing circuitry is configured with instructions to activate the sound device if the angle and the distance is outside the set parameter.

In some embodiments, the processor includes circuitry configured with instructions to send an alert if the angle and the distance is outside the set parameter.

In some embodiments, the wireless communication node comprises a radio component and a wi-fi component.

In some embodiments, the radio component is configured to send information between two or more microprocessors within the same parking device.

In some embodiments, the wireless communication node connects to a user interface on a mobile device, wherein the processor includes circuitry configured with instructions to send parking information to an application on a mobile device.

In some embodiments, the application on a mobile device displays vacancy and occupancy of a parking spot.

In some embodiments, the application on a mobile device displays parking violations.

In some embodiments, the user interface displays whether a parking spot is occupied or vacant.

In some embodiments, the back side of the T-shape contains, a camera at its center and a LiDAR sensor at each end.

In some embodiments, the parking device can monitor up to two cars simultaneously.

In some embodiments, the parking device is lightweight and portable.

In some embodiments, the second support contains a microprocessor.

In another aspect, a method of reserving a parking spot is described, comprising accessing the application on a mobile device, selecting a parking spot and clicking reserve, sending the reservation to the parking device.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
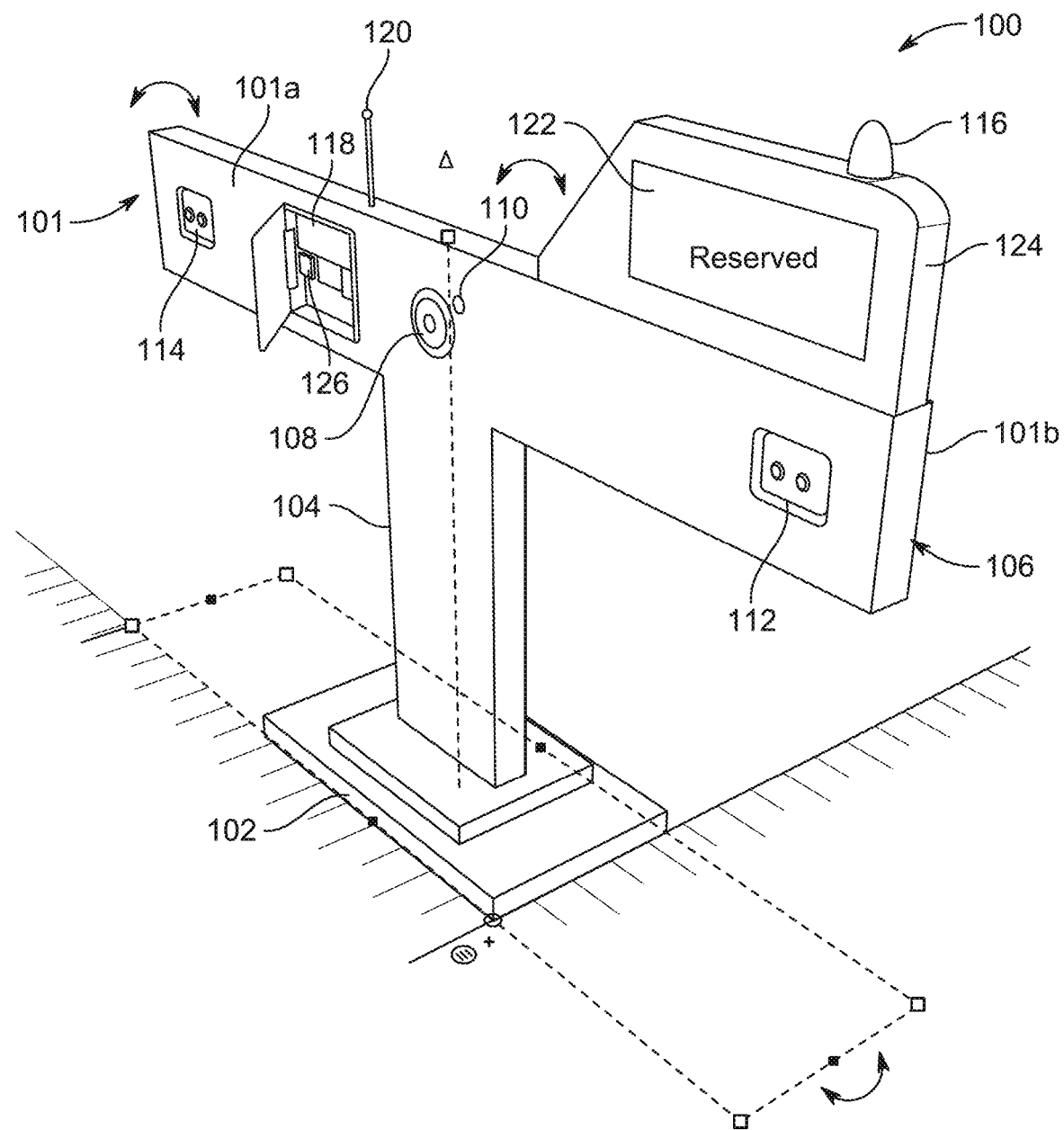
FIG. 1 is a perspective view of a parking device comprising a T-shaped module, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a parking device and a method that provide parking management through an integrated T-shaped modular design incorporating multiple sensing technologies, wireless communication capabilities, and user interface systems. The present disclosure addresses challenges in urban parking management by combining real-time vehicle detection, license plate recognition, violation monitoring, and reservation management within a single portable device. The integrated approach enables efficient monitoring of multiple parking spaces simultaneously while providing immediate feedback to users and security personnel through coordinated alert systems and mobile application interfaces. The modular design facilitates flexible deployment across diverse parking environments without requiring extensive infrastructure modifications or permanent installation procedures. The parking device of the present disclosure incorporates wireless sensor network technology to enable scalable expansion and centralized management of multiple devices across large parking facilities while maintaining autonomous operation capabilities for individual units.

FIG. 1 illustrates a perspective view of a parking device 100 comprising a T-shaped module 101. The parking device 100 is designed to address challenges in urban parking management through wireless sensor network technology and Internet of Things (IoT) connectivity. The parking device 100 provides real-time monitoring capabilities for parking spaces while maintaining portability and cost-effectiveness for widespread deployment. The parking device 100 integrates multiple sensing technologies with wireless communication capabilities to create a wide-ranging parking management solution. The parking device 100 enables both individual parking space monitoring and networked operation across multiple parking areas.

As illustrated, the parking device 100 comprises a two-tiered rectangular base 102 that provides structural foundation and stability for the T-shaped module 101. The two-tiered rectangular base 102 consists of an upper tier and a lower tier that create a stepped configuration for enhanced stability during deployment. The two-tiered rectangular base 102 is designed to withstand outdoor environmental conditions including wind, rain, and temperature variations. The configuration of the two-tiered rectangular base 102 enables secure positioning on various surface types including asphalt, concrete, and paved parking areas. For present purposes, the two-tiered rectangular base 102 may incorporate mounting features that facilitate temporary or permanent installation depending on deployment requirements. The stepped design of the two-tiered rectangular base 102 provides visual prominence while maintaining a low profile that does not obstruct vehicle movement or visibility.

In embodiments, the top tier of the two-tiered rectangular base 102 can resistively slide forward and backward on the bottom tier of the two-tiered rectangular base 102. In embodiments, the bottom tier of the two-tiered rectangular base 102 includes a dampening slide, such that the top tier can resistively slide backward and forward on the bottom tier. The dampening slide allows for the allows the top tier of the two-tiered rectangular base 102 and the first and second support 104 and 106 to all slide backwards when the parking device 100 is impacted with a car. The dampening slide allows the top tier of the two-tiered rectangular base 102 and the first and second support 104 and 106 to move back into the typical configuration, wherein the top tier is centered on the bottom tier, when there is no longer a force applied to the parking device 100.

The parking device 100 further comprises a first support 104 comprising a cuboid that is perpendicular to the base 102. The first support 104 extends vertically upward from the two-tiered rectangular base 102 to provide vertical structure for the T-shaped module 101. In a non-limiting example, as shown, the first support 104 has a rectangular cross-section that provides structural rigidity while minimizing material usage and weight. The first support 104 is positioned centrally on the two-tiered rectangular base 102 to ensure balanced weight distribution and stability. In present configuration, the first support 104 may house internal components including power management systems and primary processing elements. The vertical orientation of the first support 104 facilitates optimal positioning of components mounted on the horizontal second support.

The parking device 100 further comprises a second support 106 comprising a cuboid that is perpendicular to the first support 104 such that the first and second support form a T-shape. The second support 106 extends horizontally from the upper portion of the first support 104 to create the characteristic T-shaped configuration. The second support 106 provides mounting surfaces and internal space for sensors, communication devices, and user interface components. The horizontal orientation of the second support 106 enables bilateral monitoring capabilities for adjacent parking spaces. The second support 106 is positioned at a height that provides optimal sensor coverage while remaining visible to vehicle occupants and parking facility users. The T-shaped configuration created by the first support 104 and the second support 106 maximizes functional capacity while maintaining structural efficiency.

Herein, the first support 104 has a width equal to X, and the first and second support 104, 106 have a thickness of 0.1×X to 0.25×X. This dimensional relationship between width and thickness ensures structural integrity while maintaining appropriate proportions for the T-shaped module 101. The width X of the first support 104 is selected to provide adequate internal space for components while maintaining portability and visual proportion. The thickness range of 0.1×X to 0.25×X for both supports 104, 106 provides flexibility in design optimization based on specific deployment requirements and component configurations. The dimensional specifications ensure that the parking device 100 maintains structural stability under various environmental loading conditions. The proposed proportional relationship between width and thickness facilitates manufacturing consistency and component standardization across different deployment scenarios.

Herein, the second support 106 has a height of 0.5×X to 1.5×X. The second support 106 has a width of 6×X to 8×X. The width of the second support 106 relative to the first support 104 results in an overhang of the T-shaped arms of approximately 2.5×X to 3.5×X on each side. The T-shaped module 101 has a height of 2×X to 4×X.

As may be seen, the T-shape (T-shaped module 101) has a front side 101*a* and a back side 101*b* that provide distinct functional areas for component mounting and operational capabilities. In present examples, the front side 101*a* of the T-shaped module 101 faces the primary monitoring area and contains user-facing components including display and status indicators. The back side 101*b* of the T-shaped module 101 provides additional monitoring coverage and houses components for expanded sensing capabilities. The designation of front and back sides 101*a*, 101*b* enables systematic design for component placement and operational workflow. Such dual-sided configuration of the T-shaped module 101 maximizes monitoring coverage while maintaining organized component layout.

In present embodiments, the front side 101*a* of the second support 106 contains a camera 108 and a sound device 110 at a center position. The camera 108 is positioned at the center of the front side 101*a* to provide optimal coverage of the primary monitoring area. The camera 108 includes image capture capabilities for license plate recognition and visual documentation of parking activities. The sound device 110 is located adjacent to the camera 108 to provide audio alerts and notifications directly to vehicle occupants and parking facility users. The center positioning of the camera 108 and the sound device 110 ensures equal coverage distribution across the monitoring area. This central location facilitates clear line-of-sight communication with vehicles and users in both adjacent parking spaces.

Further, the front side 101*a* of the second support 106 contains a LiDAR sensor 112 at a first end and a LiDAR sensor 114 at a second end. The LiDAR sensor 112 at the first end provides distance measurement and object detection for one side of the monitoring coverage area. The LiDAR sensor 114 at the second end provides corresponding measurement capabilities for the opposite side of the coverage area. The positioning of LiDAR sensors 112, 114 at opposite ends enables wide-ranging distance monitoring across the full width of adjacent parking spaces. It may be appreciated that the end positioning of LiDAR sensors 112, 114 maximizes coverage area while minimizing interference between sensor operations. Herein, the LiDAR sensors 112, 114 operate continuously to detect vehicle presence, positioning, and movement within the monitored parking areas. The dual LiDAR configuration enables detection of improper parking alignment by comparing distance measurements from both sensors 112, 114.

Further, the front side 101a of the second support 106 additionally contains a lamp and/or LED 116 (hereinafter, lamp 116) on the first end, and a battery 118 and a wireless communication node 120 on the second end. The lamp 116 is positioned on the first end adjacent to the LiDAR sensor 112 to provide visual indication and alert capabilities. Herein, the lamp 116 may include LED technology for energy efficiency and high visibility under various lighting conditions. The battery 118 on the second end provides power storage and management for autonomous operation of the parking device 100. The wireless communication node 120 is co-located with the battery 118 to facilitate integrated power management and communication operations. The positioning of the lamp 116 on the first end, and the battery 118 with the wireless communication node 120 on the second end may aid in creating balanced weight distribution across the second support 106. The distributed placement of components across the ends of the second support 106 also enables efficient utilization of available space.

The parking device 100 further includes a liquid crystal display 122 disposed in a casing 124 having a right trapezoidal prism shape having a thickness that is the same as the thickness of the second support 106 is present on top of the first end of the second support 106. The liquid crystal display 122 provides visual information display capabilities for parking status, system messages, and user notifications. The casing 124 with right trapezoidal prism shape creates an angled viewing surface that enhances visibility from multiple viewing angles. The right trapezoidal prism shape of the casing 124 enables optimal viewing angles while protecting the liquid crystal display 122 from environmental exposure. The thickness of the casing 124 matches the thickness of the second support 106 to maintain visual continuity and structural integration. The proposed positioning on top of the first end places the liquid crystal display 122 in a prominent location for maximum visibility. It may be understood that the integration of the liquid crystal display 122 at the first end provides clear status indication for the parking spaces monitored by that end of the parking device 100.

In the parking device 100, a straight edge of the right trapezoidal prism is aligned with an upper edge of the first end of the second support 106 such that the casing edge and the upper edge of the second support are flush, and an angled edge of the right trapezoidal prism shape is pointed towards the second end of the second support 106. The alignment of the straight edge with the upper edge of the second support 106 creates integration between the display assembly and the main structure. The flush mounting ensures structural continuity and weather sealing between the casing 124 and the second support 106. The angled edge pointing towards the second end creates optimal viewing geometry for users approaching from various directions. The angled orientation facilitates visibility while directing attention toward the monitored parking areas. The specific alignment and orientation of the right trapezoidal prism shape maximizes display effectiveness while maintaining structural integrity and aesthetic appeal.

In present embodiments, the back side 101b of the T-shape (the T-shaped module 101) contains the camera 108 at its center and the LiDAR sensor 112, 114 at each end (herein, the camera 108 and the LiDAR sensors 112, 114 at the back side 101b have been assigned the same numerals for common reference with its counterparts in the front side 101a). The camera 108 on the back side 101b provides additional visual monitoring capabilities for expanded coverage area. The camera 108 on the back side 101b enables license plate recognition and visual documentation for vehicles approaching from the opposite direction. The LiDAR sensors 112, 114 at each end of the back side 101b provide distance measurement and object detection for the rear monitoring coverage area. These sensors on the back side 101b enable the parking device 100 to monitor up to two cars simultaneously by providing coverage in both forward and rearward directions. The dual-sided sensor configuration maximizes monitoring efficiency while maintaining compact device footprint.

The parking device 100 further includes a microprocessor 126 contained within the second support 106. The microprocessor 126 serves as the central processing unit for all sensing, communication, and control operations of the parking device 100. The integration of the microprocessor 126 within the second support 106 provides centralized control while maintaining protection from environmental conditions. The microprocessor 126 includes processing circuitry configured with program instructions for executing parking monitoring algorithms and system control functions. The microprocessor 126 coordinates data collection from sensors, processes information for decision making, and manages communication with external systems. The microprocessor 126 also maintains operational parameters and configuration settings for customized deployment scenarios. The microprocessor 126 enables real-time processing of sensor data and immediate response to parking events and violations.

Figure 2:
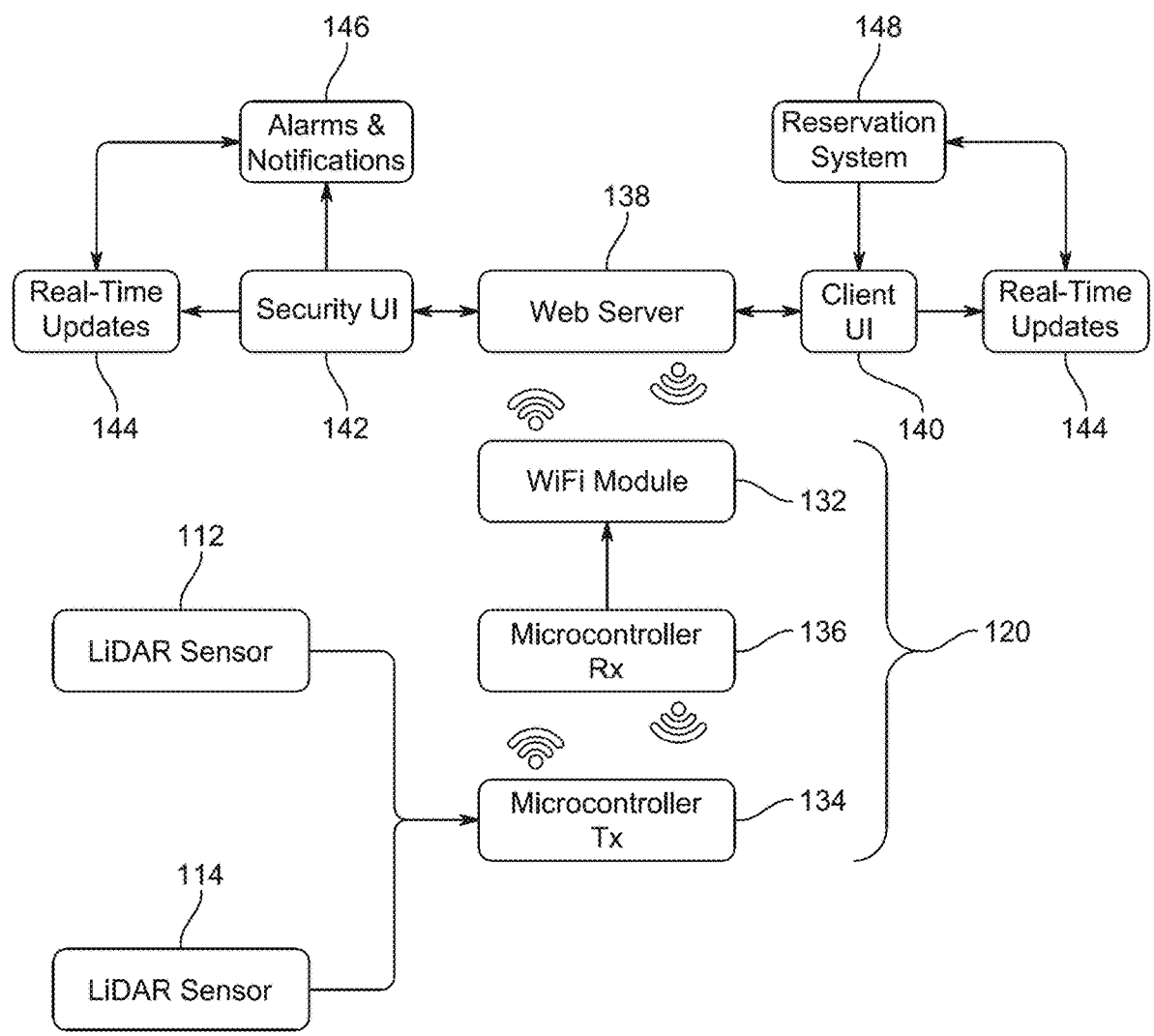
FIG. 2 is a schematic system architecture diagram of the parking device showing component relationships and data flow therein, according to certain embodiments.

Referring to FIG. 2, illustrated is a system architecture diagram showing component relationships and data flow for the parking device 100 and associated systems. The system architecture includes the LiDAR sensors 112, 114 that continuously monitor parking spaces for vehicle presence and positioning. The microprocessor 126 receives data from the LiDAR sensors 112, 114 and processes the information for parking status determination and violation detection. The wireless communication node 120 connects the microprocessor 126 to external networks for data transmission and remote system access.

Herein, the wireless communication node 120 includes a WiFi module 132 which enables real-time communication between the parking device 100 and web-based management systems, as discussed later in detail. The wireless communication node 120 further includes a transmitting microcontroller 134 that manages local data collection and initial processing from sensors. The wireless communication node 120 further includes a receiving microcontroller 136 that coordinates data aggregation from multiple parking devices 100 and manages communication with centralized systems. The wireless communication between the transmitting microcontroller 134 and the receiving microcontroller 136 enables networked operation of multiple parking devices across large parking facilities.

Further, in the system architecture, a web server 138 receives data from the receiving microcontroller 136 and provides centralized management and monitoring capabilities. The web server 138 supports both a client user interface 140 and a security user interface 142 for different operational requirements. The client user interface 140 provides parking space availability information and reservation capabilities for parking facility users. The security user interface 142 enables monitoring and management of parking violations and security events. Real-time updates 144 flow between the web server 138 and both user interfaces to ensure current information availability. Alarms and notifications 146 are generated by the system to alert security personnel and users of violations or system events. A reservation system 148 integrates with the web server 138 to manage parking space reservations and user account information.

According to embodiments of the present disclosure, in the parking device 100, the camera 108 is configured to capture an image of the license plate of a vehicle positioned within the monitoring coverage area. The camera 108 includes digital imaging capabilities with sufficient resolution for license plate character recognition under various lighting conditions. The camera 108 operates automatically when vehicle presence is detected by the LiDAR sensors 112, 114. The parking device 100 includes circuitry configured with instructions to identify and record a license plate number from captured images. The license plate identification circuitry includes optical character recognition algorithms that process captured images to extract alphanumeric characters. The processor maintains a database of authorized license plates for comparison with captured images during reservation verification.

Further, the parking device 100 includes circuitry configured with instructions to wirelessly send the license plate number to user device. The wireless transmission capability enables real-time sharing of license plate information with security personnel and system administrators. The circuitry utilizes the wireless communication node 120 to transmit license plate data through established network connections. The transmission includes timestamp and location information to provide context for license plate captures. The wireless communication enables immediate notification of unauthorized vehicles in reserved parking spaces.

In present embodiments, the LiDAR sensor 112, 114 detects a distance between a vehicle and the parking device 100. The LiDAR sensors operate using laser-based distance measurement technology that provides accurate readings regardless of ambient lighting conditions. The LiDAR sensors continuously scan the monitoring area to detect vehicle presence and movement. The processor includes circuitry configured with instructions to identify an angle and a distance from the parking device 100 at which a vehicle is parked and determine if the angle and the distance is within a set parameter. The angle measurement capability enables detection of vehicles parked at improper orientations relative to parking space boundaries. The distance measurement enables detection of vehicles extending beyond designated parking space limits.

Herein, the set parameter defines acceptable parking positions and orientations for proper parking compliance. The set parameter includes tolerance ranges for distance and angle measurements to accommodate normal parking variations. The processor continuously compares measured values against the set parameter to determine parking compliance status. The processing circuitry is configured with instructions to activate the lamp 116 if the angle and the distance is outside the set parameter. The lamp 116 activation provides immediate visual notification to vehicle operators regarding improper parking positioning. The lamp 116 includes multiple lighting modes including steady illumination and flashing patterns for different violation types.

Further, in an embodiment, the processing circuitry is configured with instructions to activate the sound device 110 if the angle and the distance is outside the set parameter. The sound device 110 produces audio alerts that notify vehicle operators of parking violations and encourage corrective action. In present configurations, the sound device 110 may be adapted to include multiple alert patterns and volume levels for different violation severity levels. The processor includes circuitry configured with instructions to send an alert if the angle and the distance is outside the set parameter. Such alert transmission capability notifies security personnel and system administrators of parking violations for appropriate response actions.

In some embodiments, the wireless communication node 120 comprises a radio component and a wi-fi component for comprehensive connectivity capabilities. In an example, as discussed in reference to the system architecture of FIG. 2, the radio component may incorporate the transmitting microcontroller 134 and the receiving microcontroller 136, and the wi-fi component may incorporate the WiFi module 132. Herein, the radio component provides short-range communication between parking devices 100 within the same parking facility. The wi-fi component enables connection to internet-based systems for remote monitoring and management. The radio component is configured to send information between two or more microprocessors within the same parking device 100. The internal communication capability enables coordination between distributed processing elements and sensor systems. The radio component also facilitates communication between multiple parking devices 100 to create networked monitoring systems, as discussed later in detail in reference to FIG. 5.

In an implementation, the wireless communication node 120 connects to a user interface on a mobile device. The mobile device connection enables users to access parking information and system features remotely, providing real-time user interaction capabilities. The processor includes circuitry configured with instructions to send parking information to an application on a mobile device. Herein, the parking information may include real-time availability status, reservation confirmation, and violation notifications. The mobile application integration provides convenient access to parking system features and information.

Figure 3A:
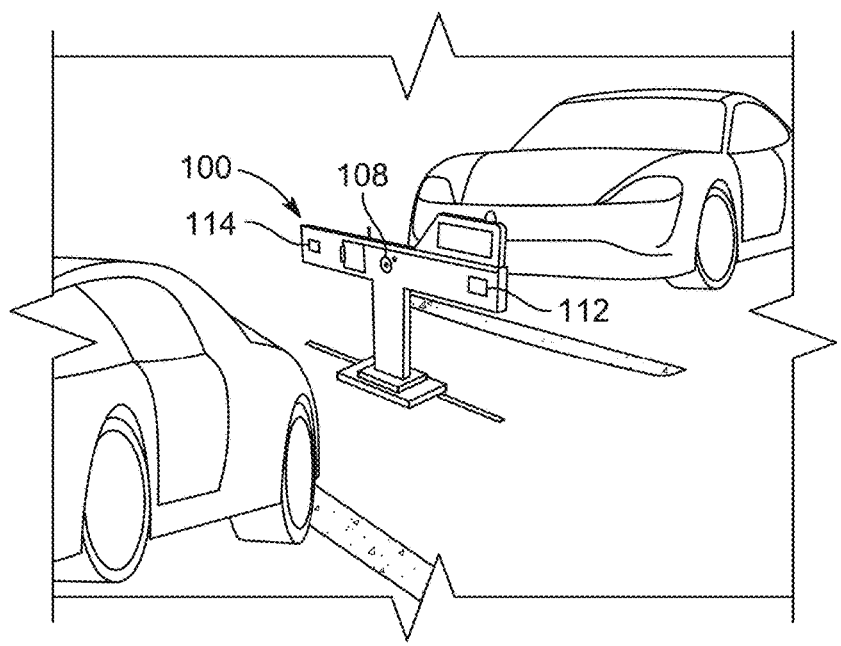
FIG. 3A is an exemplary perspective view of the parking device positioned for monitoring two parking spaces simultaneously, according to certain embodiments.
Figure 3B:
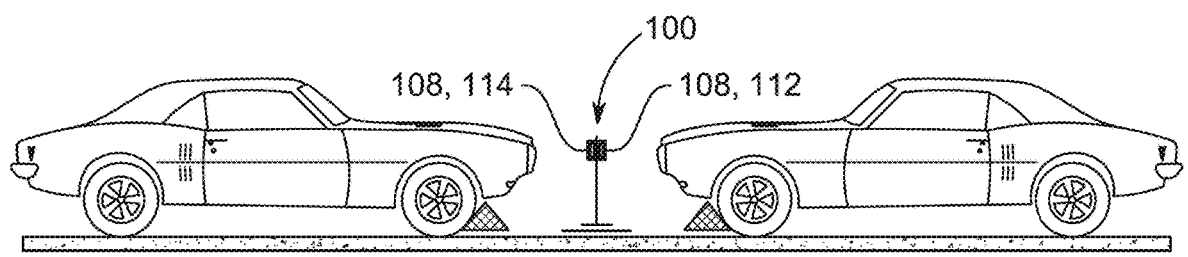
FIG. 3B is an exemplary plan view of the parking device positioned for monitoring two parking spaces simultaneously, according to certain embodiments.

Referring to FIGS. 3A and 3B, illustrated are implementation examples showing the parking device 100 positioned for monitoring multiple parking spaces simultaneously. FIG. 3A shows a perspective view of the parking device 100 positioned between two vehicles to demonstrate dual monitoring capabilities. The parking device 100 is positioned at the boundary between adjacent parking spaces to provide coverage for both spaces with a single device. The positioning enables the LiDAR sensors 112, 114 at opposite ends to monitor vehicle presence and positioning in both adjacent spaces. The central location provides equal monitoring coverage and user interface access for occupants of both monitored parking spaces. FIG. 3B shows a plan schematic view illustrating how the parking device 100 monitors two parking spaces simultaneously. The schematic demonstrates the coverage areas of the LiDAR sensors 112, 114 extending into adjacent parking spaces for comprehensive monitoring. The positioning of the parking device 100 enables detection of vehicle presence, proper parking alignment, and identification of parking violations in both spaces. The dual monitoring capability reduces infrastructure requirements and installation costs compared to single-space monitoring systems.

Figure 4A:
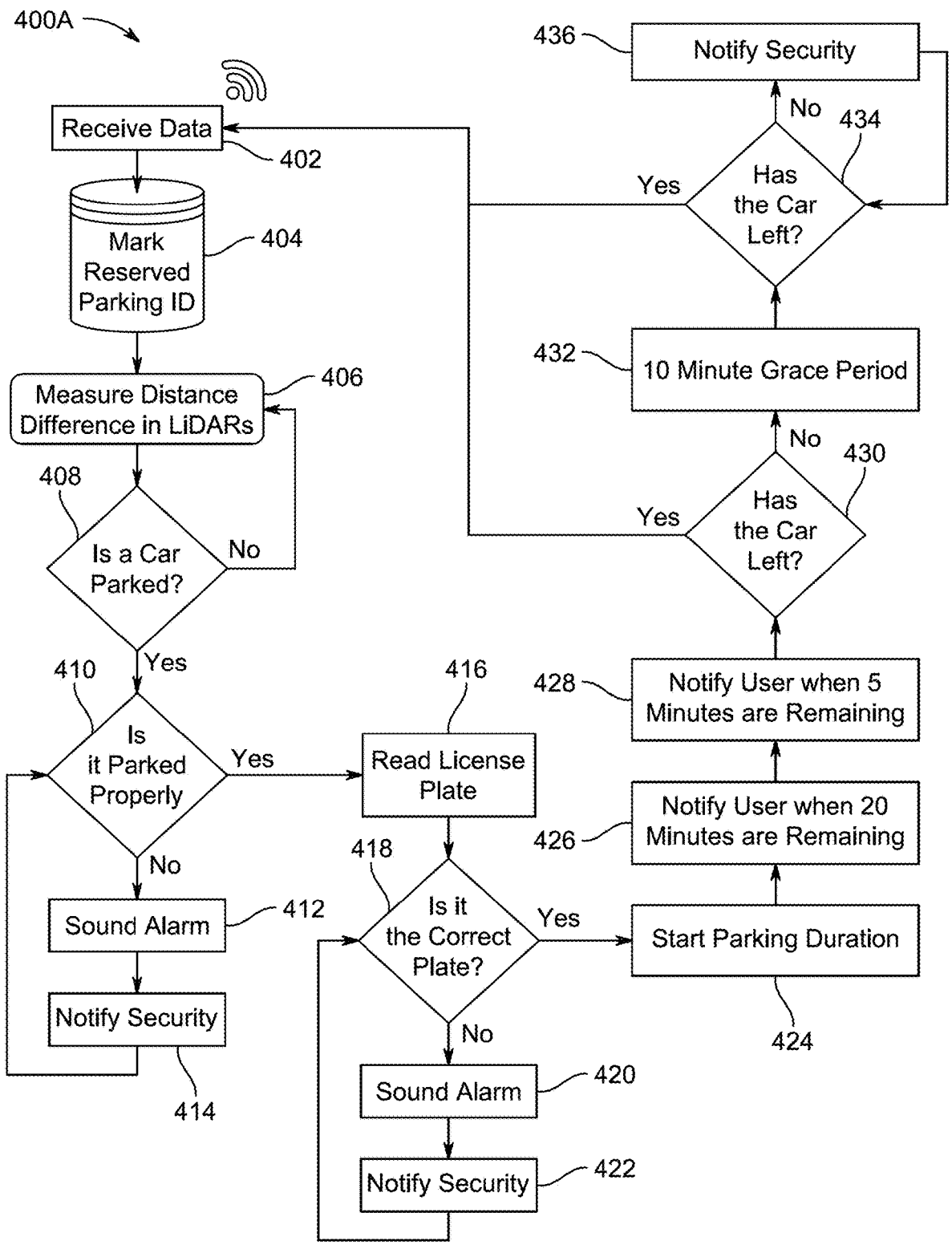
FIG. 4A is a process flowchart detailing operation of the parking device for parking monitoring and violation detection, according to certain embodiments.

Referring to FIG. 4A, illustrated is a flowchart of a process (as represented by reference numeral 400A) detailing operation of the parking device 100 for parking monitoring and violation detection. At step 402, the process 400A includes receiving data where the microprocessor 126 collects information from the LiDAR sensors 112, 114 and external systems through the wireless communication node 120. At step 404, the process 400A includes marking reserved parking ID to identify parking spaces that have been reserved through the reservation system 148. At step 406, the process 400A includes measuring distance difference in LiDAR readings by comparing readings from the LiDAR sensors 112, 114 to detect vehicle presence and positioning within the monitored parking areas.

At step 408, the process 400A includes determining whether a car is parked based on sensor data analysis from the LiDAR sensors 112, 114, 130. When no vehicle is detected, the process 400A returns to step 406 for continued monitoring of the parking spaces. When a vehicle is detected, the process 400A proceeds to step 410 which includes determining whether the vehicle is parked properly by evaluating vehicle positioning relative to parking space boundaries. The proper parking alignment determination compares distance measurements from the LiDAR sensors 112, 114, 130 to detect acceptable positioning parameters within the set parameter ranges.

At step 412, the process 400A includes sounding alarm for improperly parked vehicles by activating the sound device 110 to alert the vehicle operator of parking violations. At step 414, the process 400A includes notifying security personnel through alerts sent via the wireless communication node 120 to security monitoring systems. At step 416, the process 400A includes reading license plate for properly parked vehicles using the camera 108 for visual identification and license plate recognition. At step 418, the process 400A includes determining whether the captured license plate corresponds to the correct plate by comparing the license plate information with reservation data when applicable. At step 420, the process 400A includes sounding alarm if the license plate is not correct; and at step 422, the process 400A further notifying security.

At step 424, the process 400A includes starting parking duration if the number plate is determined to be correct for reserved space. At step 426, the process 400A includes notifying user when 20 minutes are remaining for time-limited parking reservations to provide advance warning of reservation expiration. At step 428, the process 400A includes notifying user when 5 minutes are remaining for time-limited parking reservations through the wireless communication node 120. At step 430, the process 400A includes determining whether the car has left by monitoring for vehicle departure through continuous sensor monitoring using the LiDAR sensors 112, 114. At step 432, the process 400A includes implementing a 10 minute grace period that provides tolerance for brief departures before updating parking space status to available. At step 434, the process 400A includes again determining whether the car has left by monitoring for vehicle departure through continuous sensor monitoring using the LiDAR sensors 112, 114. At step 436, the process 400A includes notifying security if it is determined that the car has now left via monitoring using the LiDAR sensors 112, 114.

Figure 4B:
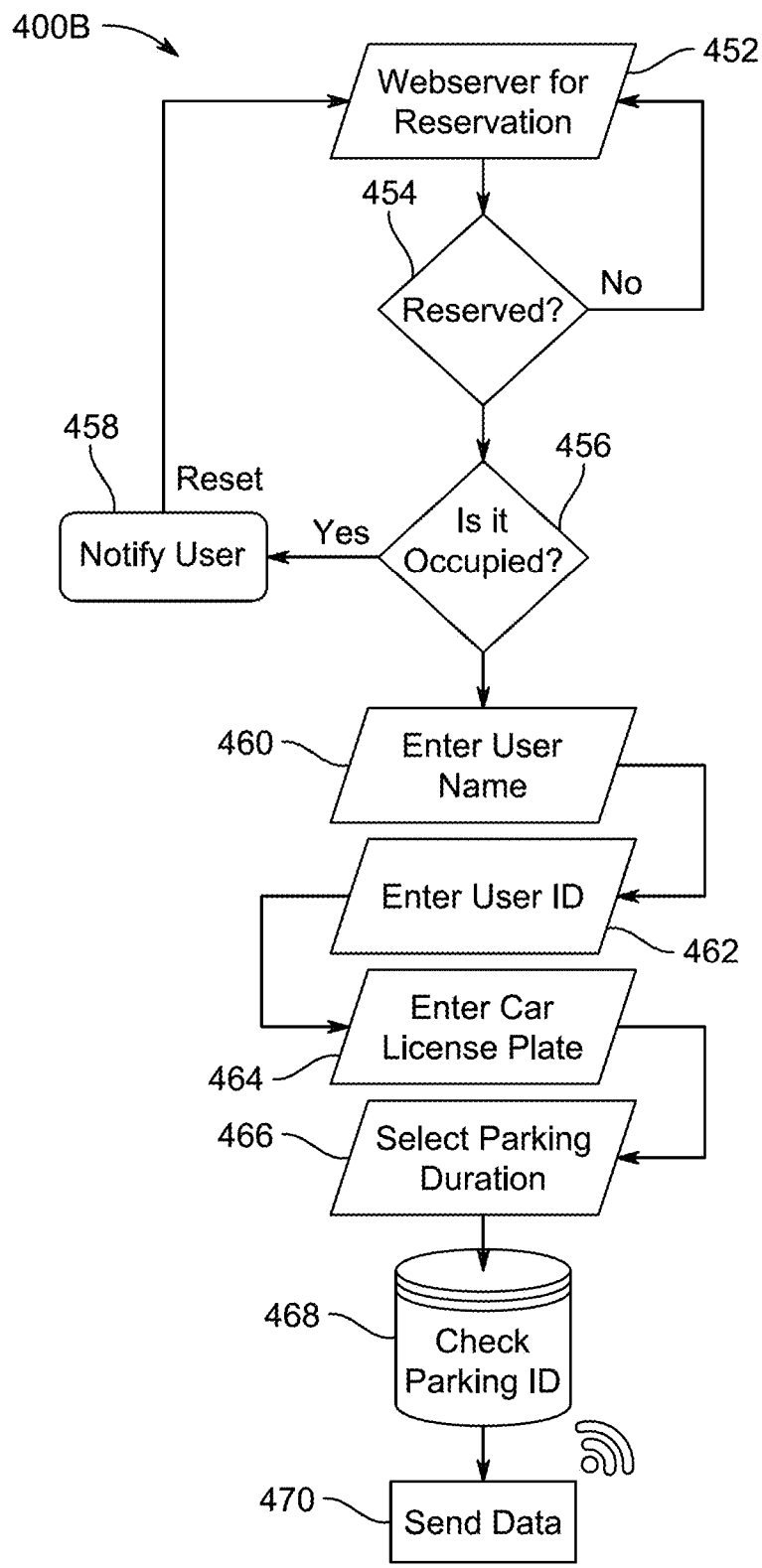
FIG. 4B is a process flowchart detailing reservation operation of the parking device for parking space management and user interaction, according to certain embodiments.

Referring to FIG. 4B, illustrated is a flowchart of a process (as represented by reference numeral 400B) detailing reservation operation of the parking device 100 for parking space management and user interaction. At step 452, the process 400B includes accessing webserver for reservation management and user interactions through the wireless communication node 120 connected to the reservation system 148. At step 454, the process 400B includes determining whether the parking space is reserved by checking reservation status through the reservation system 148 and stored reservation data within the microprocessor 126.

At step 456, the process 400B includes determining whether the parking space is occupied by analyzing current sensor data from the LiDAR sensors 112, 114, 130 to detect vehicle presence within the monitored parking area. At step 458, the process 400B includes resetting parking space status and notifying user when the parking space is not occupied, thereby updating availability information and providing real-time updates to users regarding parking space availability through the wireless communication node 120.

At step 460, the process 400B includes entering user name for user identification during the reservation process through user input interfaces connected to the reservation system 148. At step 462, the process 400B includes entering user ID for account verification and user authentication to validate user credentials within the reservation system 148. At step 464, the process 400B includes entering car license plate for vehicle registration and authorization verification during reservation creation, wherein the license plate information is stored for subsequent comparison with camera 108 captured images.

At step 466, the process 400B includes selecting parking duration to allow users to specify the length of their parking reservation period through the reservation system 148 interface. At step 468, the process 400B includes checking parking ID to validate parking space availability and reservation compatibility with user requests by accessing stored parking space data within the microprocessor 126. At step 470, the process 400B includes sending data to transmit reservation information to the parking device 100 and update system databases with current reservation status through the wireless communication node 120, thereby completing the reservation process and preparing the parking device 100 for authorized vehicle arrival.

Figure 5:
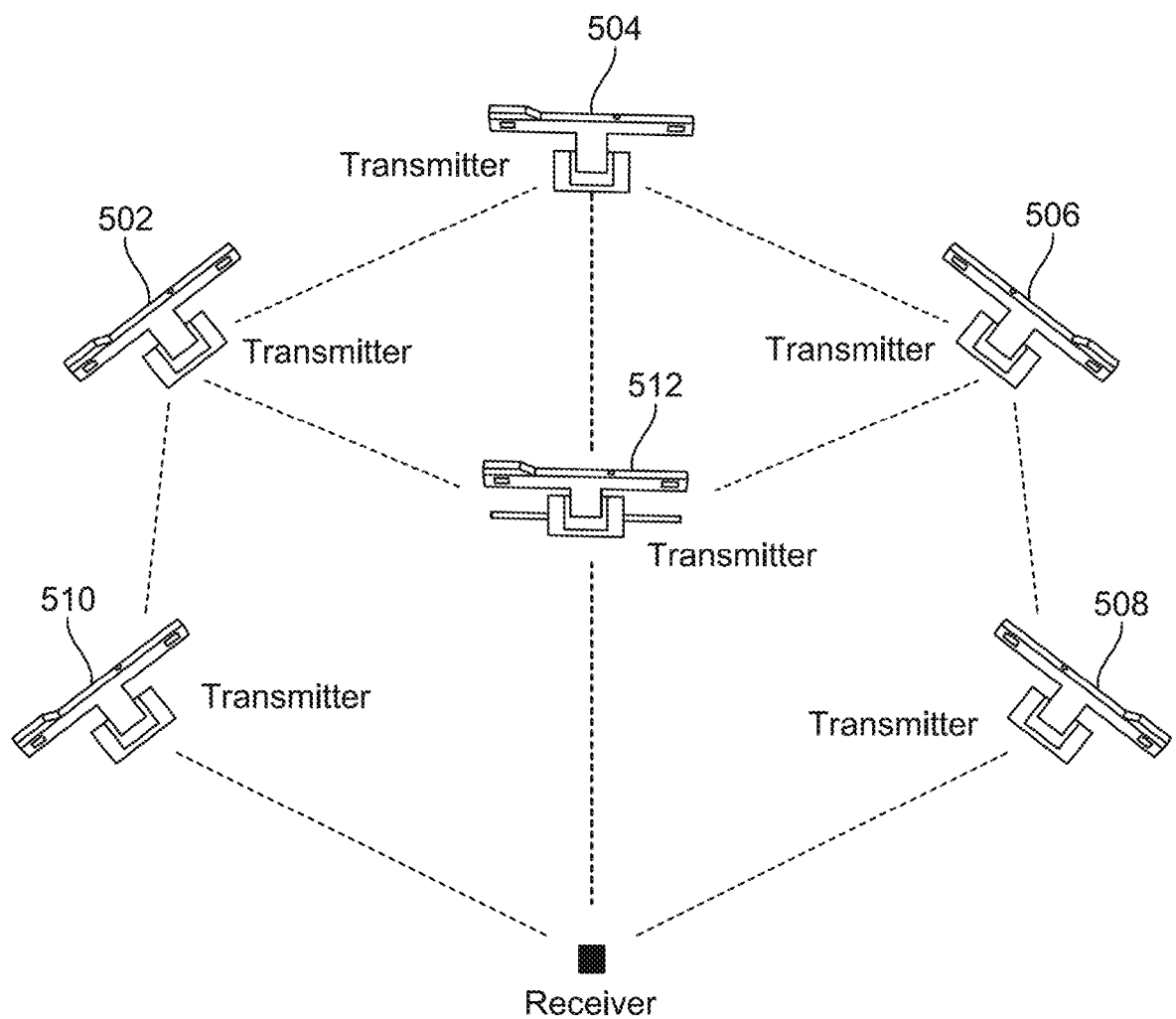
FIG. 5 is an exemplary topology diagram for the parking device showing implementation of partial mesh configuration for wireless communication thereby, according to certain embodiments.

Referring to FIG. 5, illustrated is a wireless sensor network topology diagram showing partial mesh configuration for connecting multiple parking devices 100. The network includes multiple transmitter nodes 502, 504, 506, 508, 510 that represent individual parking devices 100 deployed across a parking facility. A central receiver node 512 coordinates communication with all transmitter nodes and manages data aggregation for centralized processing. The partial mesh topology enables direct communication between adjacent transmitter nodes while maintaining connection to the central receiver node 512.

The wireless sensor network provides redundant communication paths to ensure reliable data transmission even when individual communication links experience interference or failure. The network topology enables scalable expansion by adding additional transmitter nodes without requiring modification of existing system architecture. The centralized data management through the receiver node 512 facilitates coordinated operation of multiple parking devices 100 across large parking facilities.

Figure 6A:
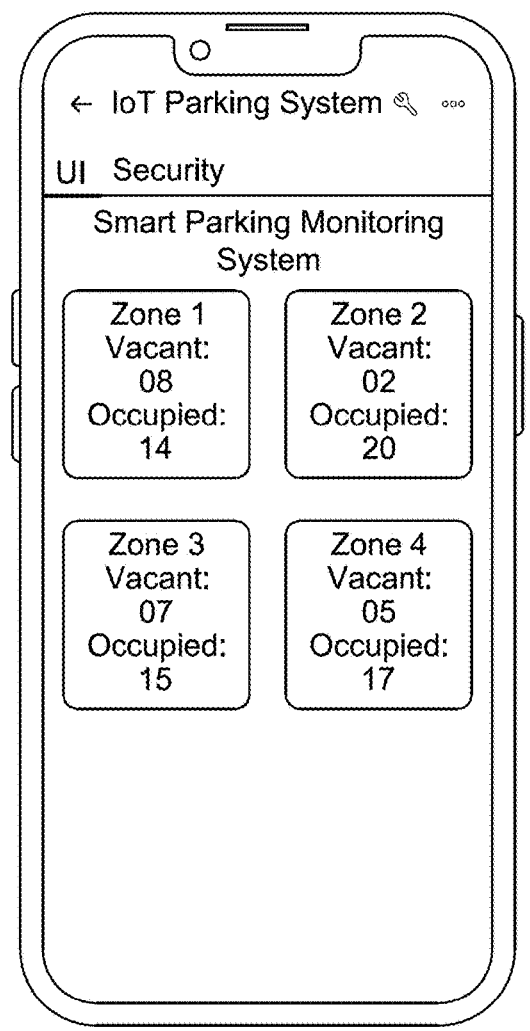
FIG. 6A is an exemplary mobile application interface showing overview of a parking zone in an implementation of the parking device, according to certain embodiments.
Figure 6B:
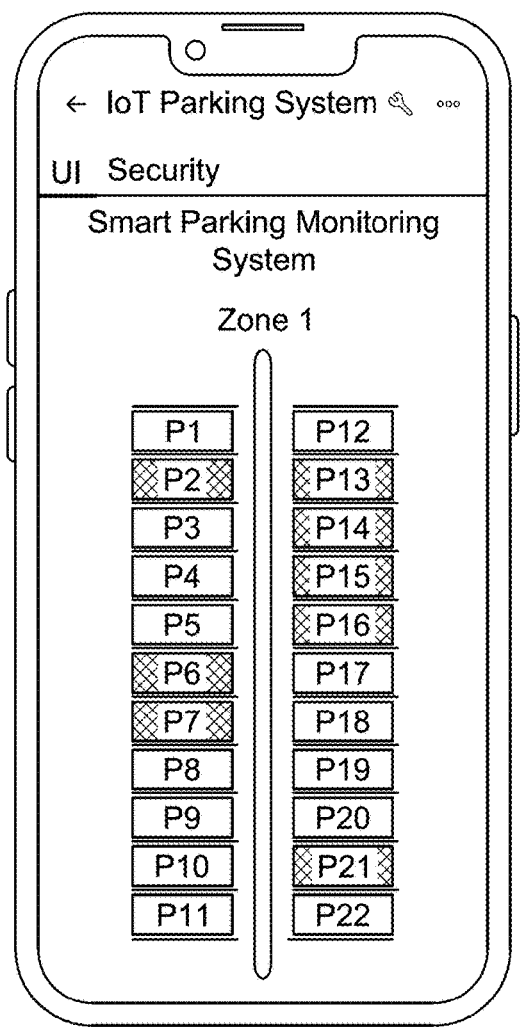
FIG. 6B is an exemplary mobile application interface displaying a status grid with individual parking spot in an implementation of the parking device, according to certain embodiments.
Figure 6C:
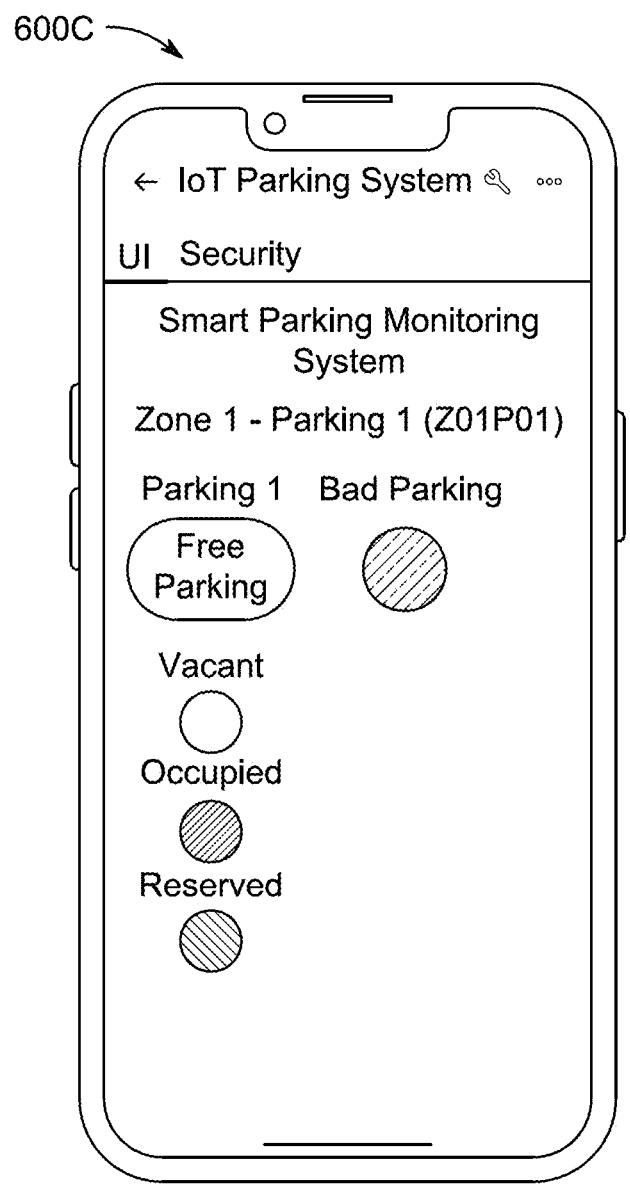
FIG. 6C is an exemplary mobile application interface showing details and reservation status for individual parking spots in an implementation of the parking device, according to certain embodiments.

Referring to FIGS. 6A, 6B, and 6C, illustrated are mobile application interfaces that demonstrate user interaction capabilities with the parking device 100 system. In present embodiments, the application on a mobile device displays vacancy and/or occupancy of a parking spot. Further, the application on the mobile device displays parking violations. Further, herein, the user interface displays whether a parking spot is occupied or vacant. Such application on the mobile device and the user interface may display such information through visual indicators and status notifications.

FIG. 6A shows a mobile application interface 600A showing a zone overview that displays the overall status of multiple parking areas. The mobile application interface 600A further displays summary information for each zone of the parking area. The mobile application interface 600A may include numerical indicators showing vacant and occupied spaces within each zone. The application on the mobile device provides such information for quick assessment of parking availability.

FIG. 6B shows a mobile application interface 600B showing a parking spot grid that displays individual parking spaces with color-coded status indicators. Herein, the mobile application interface 600B may use green indicators for vacant spaces, red indicators for occupied spaces, and other colors for reserved or restricted spaces. The grid layout provides intuitive visual representation of parking availability across the monitored area. The application on the mobile device displays parking violations through alert notifications and status indicators within the user interface.

FIG. 6C shows a mobile application interface 600C showing individual parking spots that provides detailed information and reservation capabilities for specific parking spaces. The mobile application interface 600C may include status indicators, reservation buttons, and duration selection options for user interaction. The mobile application interface 600C also displays whether a parking spot is occupied or vacant through real-time status updates from the parking device 100. The application on the mobile device provides immediate notification of status changes and reservation confirmations.

Figure 7:
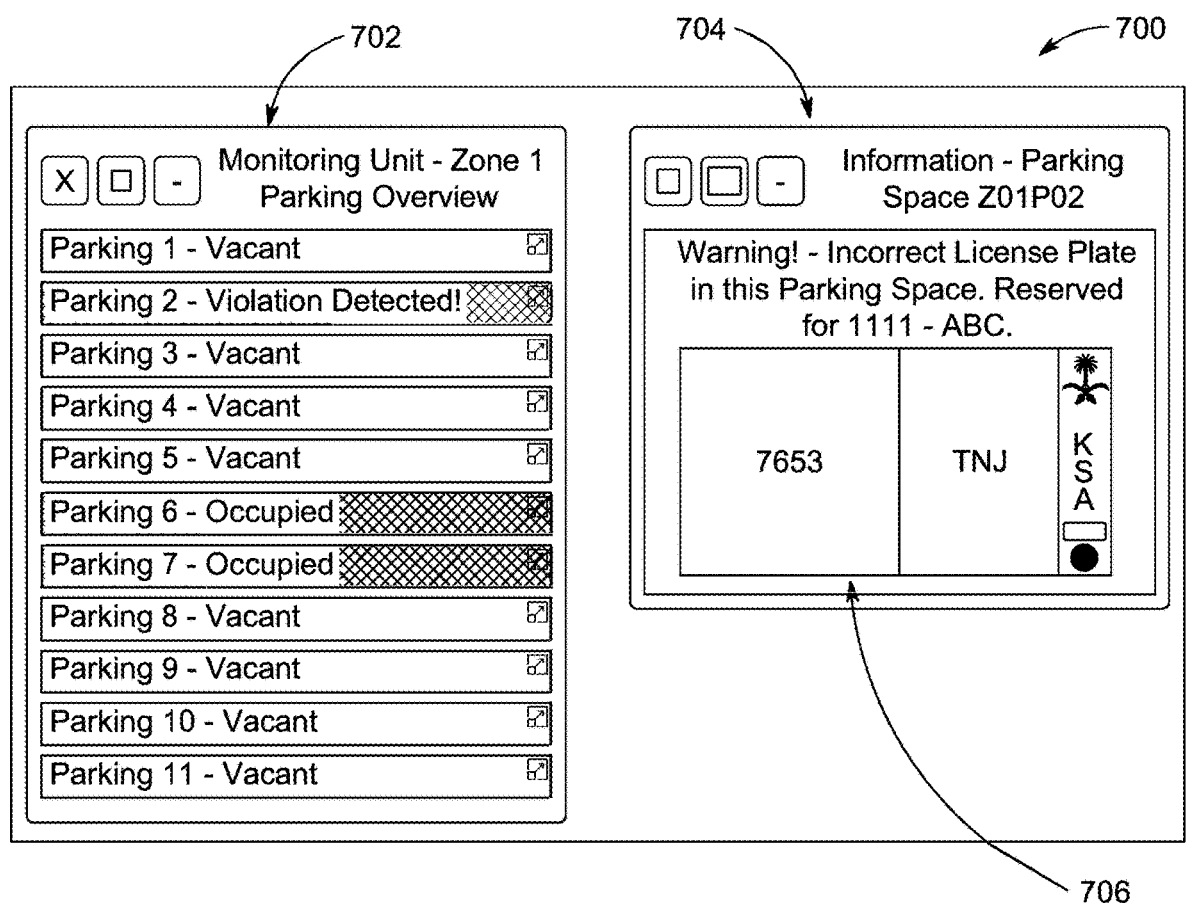
FIG. 7 is an exemplary user interface for security monitoring showing violation detection and license plate recognition in an implementation of the parking device, according to certain embodiments.

Referring to FIG. 7, illustrated is a user interface 700 for security monitoring showing violation detection and license plate recognition capabilities. The user interface 700 includes a parking status overview panel 702 that displays real-time status information for all monitored parking spaces. The overview panel 702 may use color coding to indicate vacant, occupied, reserved, and violation status for each parking space. Further, a license plate display panel 704 shows captured license plate images and recognized text for security verification and violation documentation. The user interface 700 further includes a violation alert panel 706 that provides immediate notification of parking violations including improper parking alignment and unauthorized vehicle access. The violation alerts include timestamp, location, and supporting documentation for security response coordination. Thereby, the user interface 700 provides comprehensive oversight of parking facility operations including occupancy statistics, violation frequency, and system performance metrics.

The parking device 100 of the present disclosure can monitor up to two cars simultaneously. The parking device 100 provides this functionality using the dual-sided sensor configuration and processing capabilities. The dual monitoring capability is achieved through strategic positioning between adjacent parking spaces and coordinated operation of front and back sensors. The LiDAR sensors 112, 114, being on both sides 101a, 101b, monitor vehicles in forward-facing parking spaces as well as vehicles in rear-facing spaces. Further, the cameras 108 on both sides 101a, 101b provide license plate recognition capabilities for vehicles in all monitored spaces. The microprocessor 126 coordinates data from all sensors to maintain simultaneous monitoring of multiple parking spaces.

The parking device 100 is lightweight and portable to enable flexible deployment across various parking environments. The lightweight construction utilizes materials and design features that minimize weight while maintaining structural integrity and environmental durability. The portable design enables manual transportation and positioning without requiring heavy equipment or permanent installation infrastructure. The portability facilitates temporary deployment for special events, seasonal parking needs, or changing traffic patterns. The lightweight and portable characteristics enable rapid reconfiguration of parking monitoring systems based on operational requirements.

The present disclosure further provides a method of reserving a parking spot. The method comprises accessing the application on a mobile device, to initiate the reservation process. The method further comprises selecting a parking spot and clicking reserve. The parking spot is selected from available options displayed in the mobile application interface. The selection process includes viewing parking space availability, location information, and pricing details where applicable. The method then involves clicking reserve to confirm the parking space selection and initiate the reservation transaction. The reservation confirmation process includes user authentication and payment processing when required. The method further comprises sending the reservation to the parking device 100. The reservation request is transmitted through the wireless communication system. The reservation transmission includes user identification information, vehicle license plate number, and reservation duration details. Herein, the parking device 100 receives the reservation information and updates local databases to reflect the reserved status. The parking device 100 activates monitoring protocols specific to reserved parking spaces including license plate verification and unauthorized access detection. The reservation system 148 provides confirmation to the user through the mobile application and prepares the parking device 100 for arrival of the authorized vehicle.

The parking device 100 of the present disclosure provides parking management through integration of multiple sensing technologies, wireless communication capabilities, and user interface systems within a single portable unit. The parking device 100 provides distinct advantages over conventional parking monitoring systems by eliminating the need for multiple separate devices to achieve parking space monitoring and violation detection capabilities. Where traditional systems require individual sensors for each parking space and separate communication infrastructure, the parking device 100 monitors multiple parking spaces simultaneously through the dual-ended LiDAR sensor configuration and camera systems positioned on both the front side and back side of the T-shaped module. The processing circuitry configured with instructions to identify the angle and distance at which a vehicle is parked and determine if the angle and distance is within the set parameter enables real-time violation detection and immediate response through activation of the lamp, sound device, and alert transmission via the wireless communication node. The integration of license plate recognition capabilities through the camera configured to capture images of license plates combined with the processor including circuitry configured with instructions to identify and record license plate numbers provides automated authorization verification for reserved parking spaces. The application on mobile devices displays vacancy and occupancy of parking spots while enabling users to access parking information and complete reservation processes through wireless connectivity, thereby reducing infrastructure requirements and installation complexity compared to conventional systems that rely on fixed sensor networks and centralized processing centers.

Figure 8:
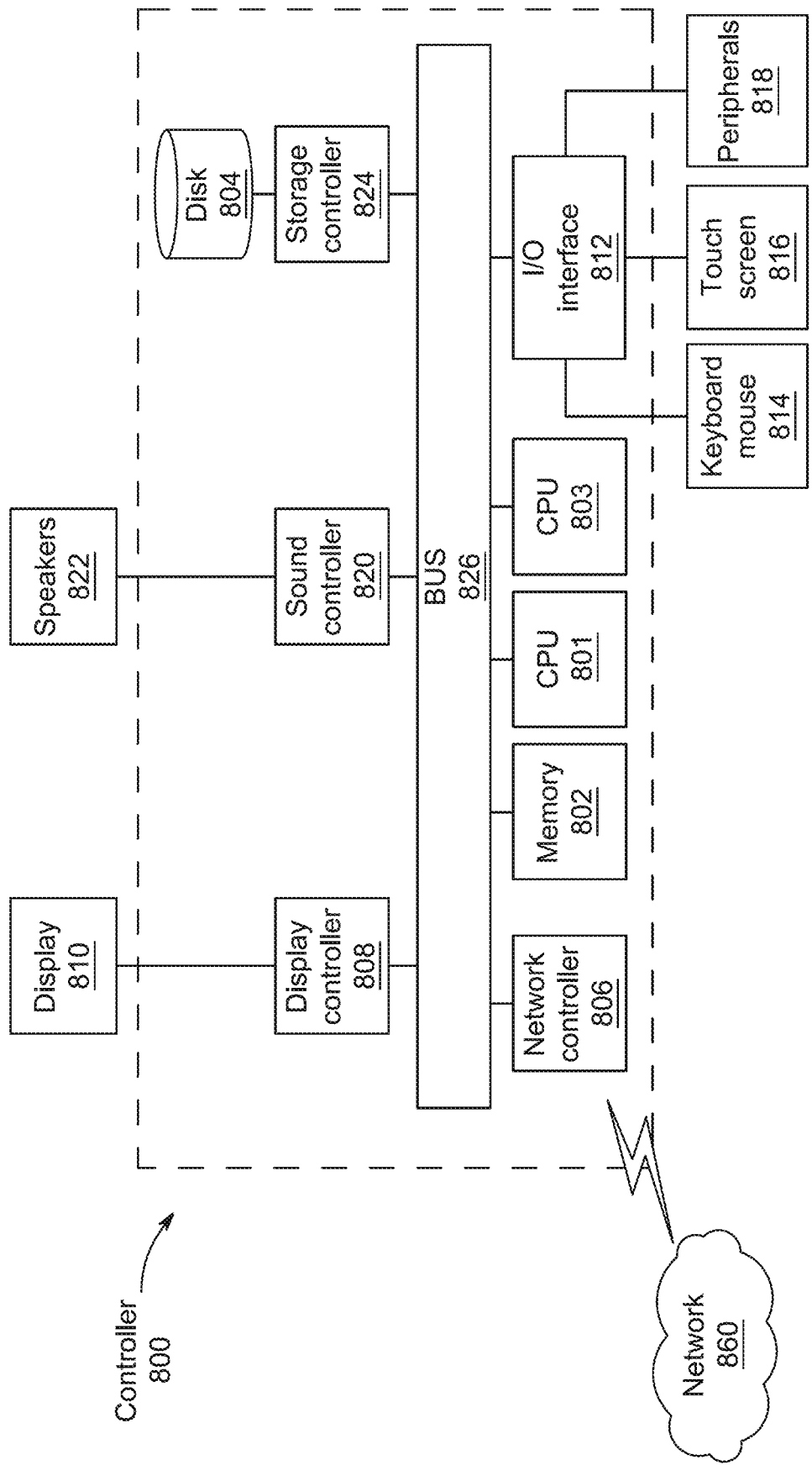
FIG. 8 is an illustration of a non-limiting example of details of computing hardware used in the computing system, according to certain embodiments.

Next, further details of the hardware description of the computing environment according to exemplary embodiments is described with reference to FIG. 8. In FIG. 8, a controller 800 is described embodying the microprocessor 126 of the parking device 100 of the present disclosure, in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
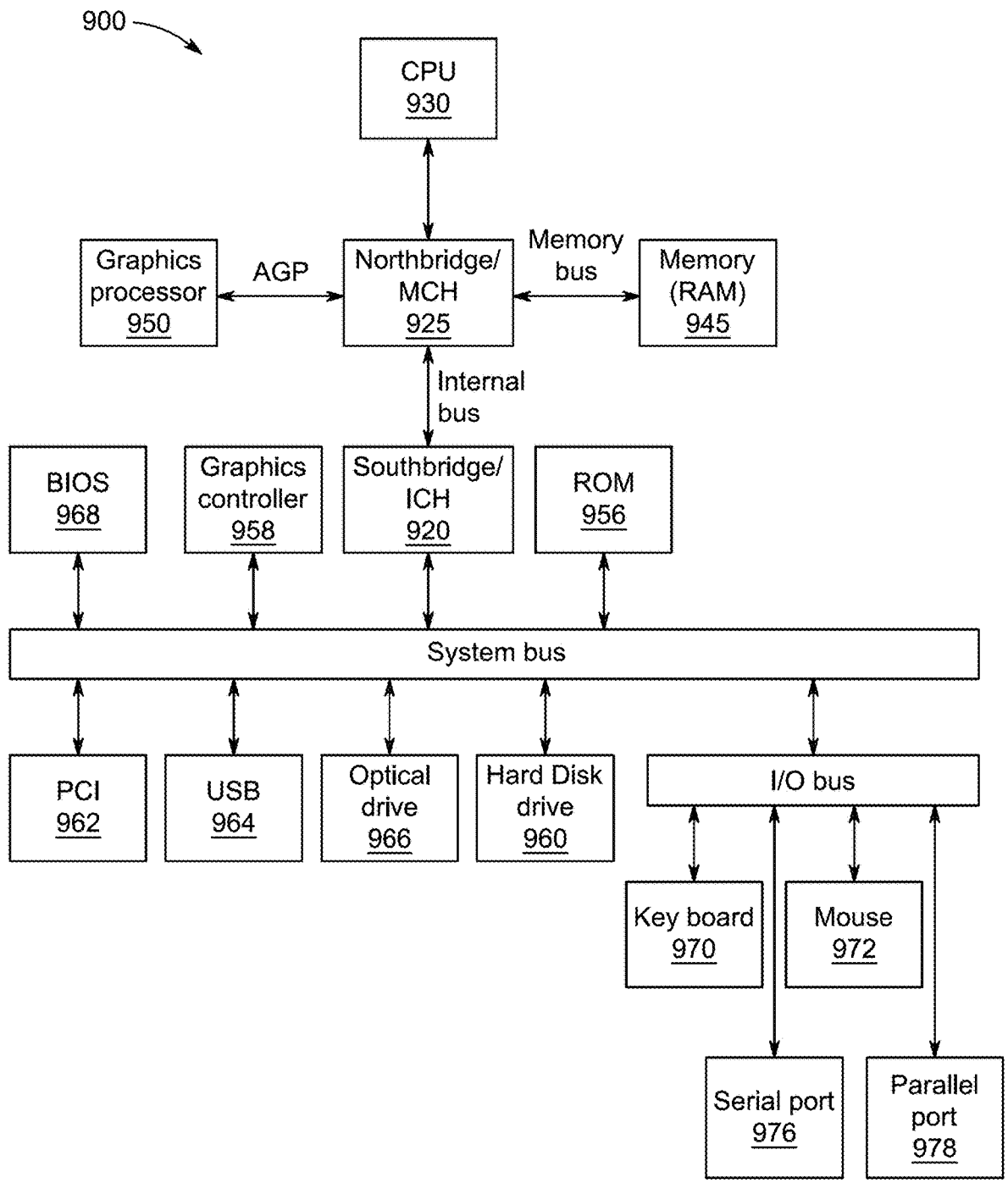
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
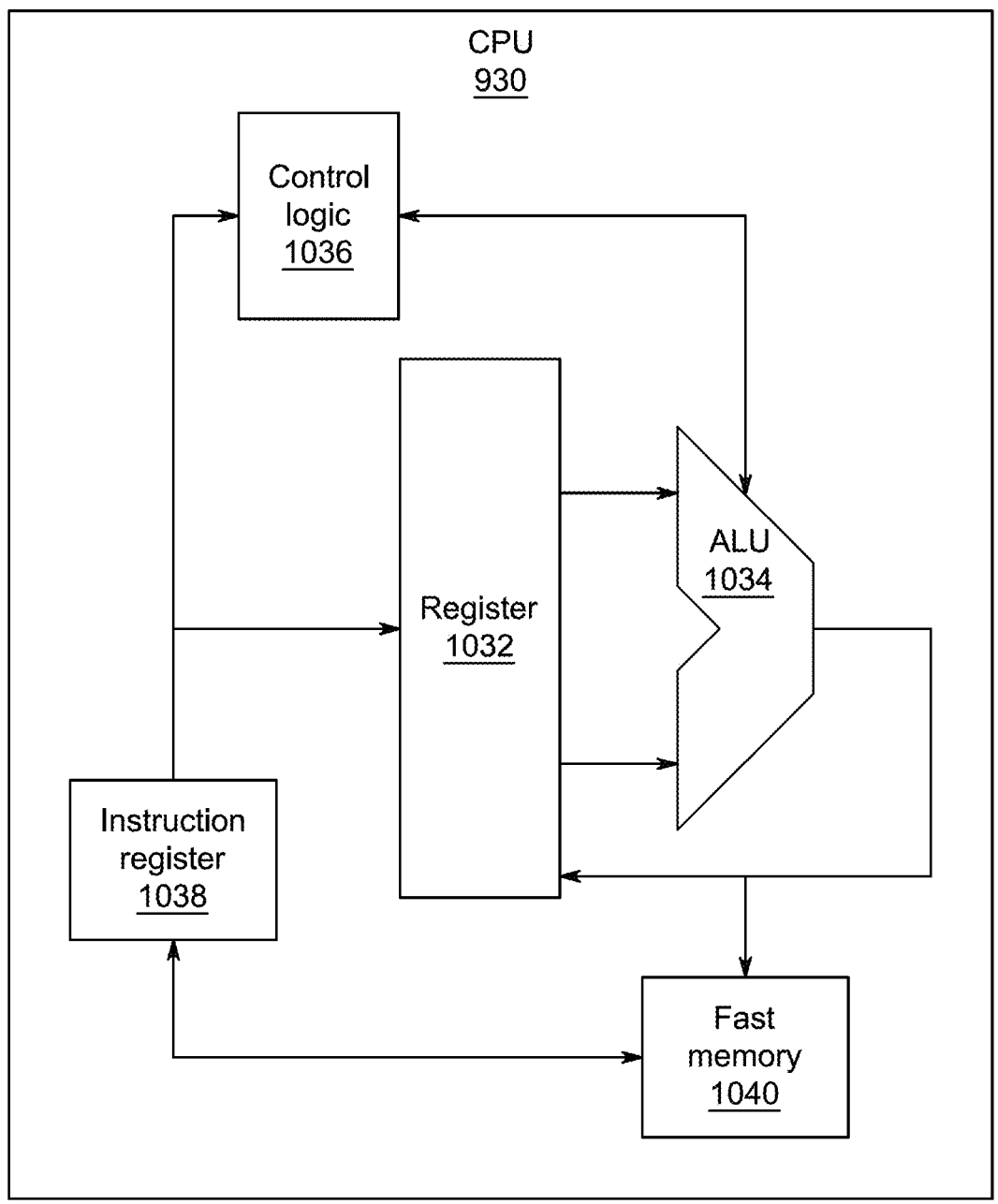
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
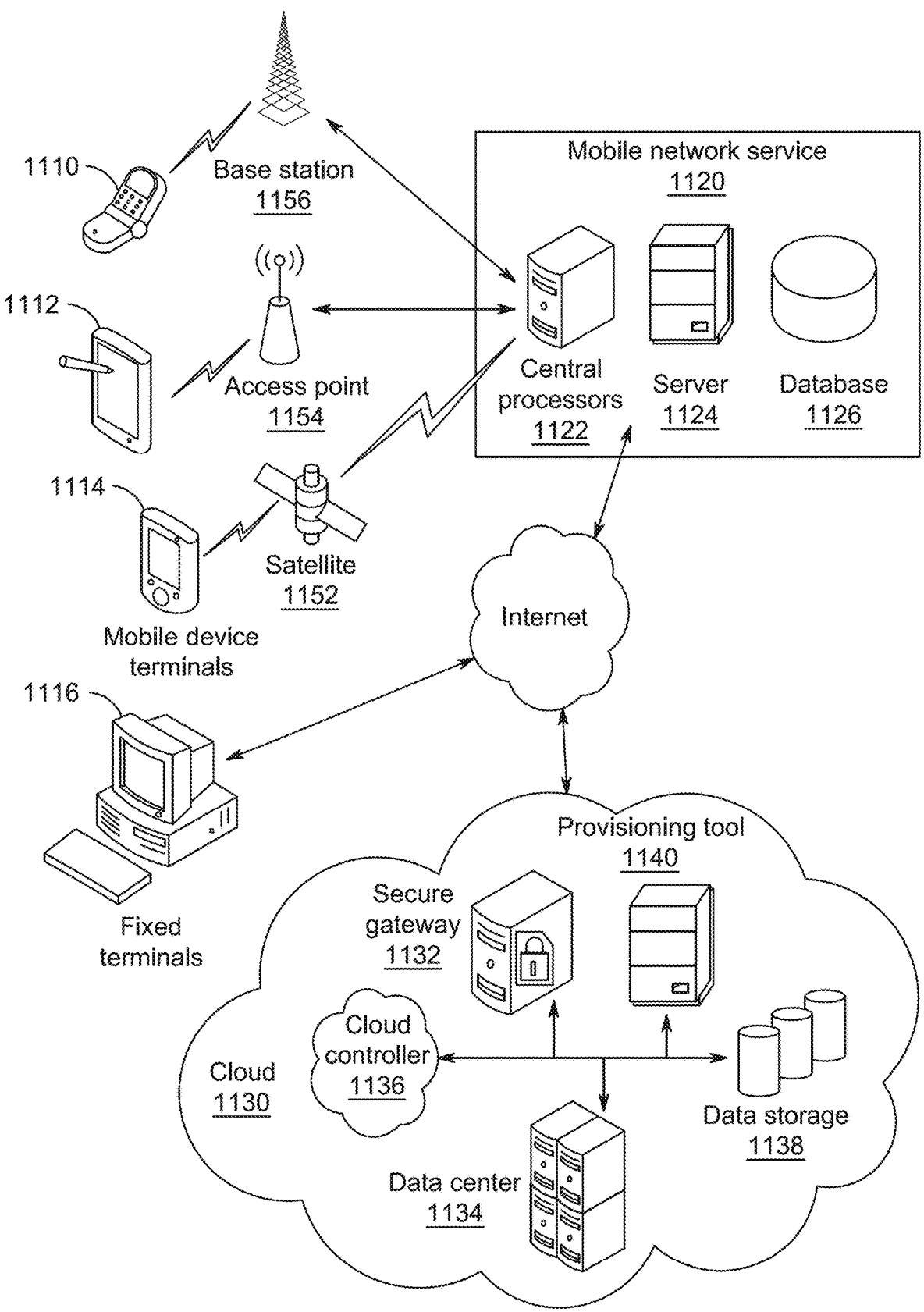
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1130 including a cloud controller 1136, a secure gateway 1132, a data center 1134, data storage 1138 and a provisioning tool 1140, and mobile network services 1120 including central processors 1122, a server 1124 and a database 1126, which may share processing, as shown by FIG. 11, in addition to various human interface and communication devices (e.g., display monitors 1116, smart phones 1110, tablets 1112, personal digital assistants (PDAs) 1114). The network may be a private network, such as a LAN, satellite 1152 or WAN 1154, or be a public network, may such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A T-shaped parking device, comprising:
a two-tiered rectangular base,
a first support comprising a cuboid that is perpendicular to the base, and
a second support comprising a cuboid that is perpendicular to the first support such that the first and second support form a T-shape,
wherein the first support has a width=X, and the first and second support have a thickness of 0.1×X to 0.25×X,
wherein the T-shape has a front side and a back side,
wherein a front side of the second support contains:
a camera and a sound device at a center position;
a LiDAR sensor at a first end and a second end;
a lamp and/or LED on the first end; and
a battery and wireless communication node on the second end,
wherein a liquid crystal display (LCD) disposed in a casing having a right trapezoidal prism shape having a thickness that is the same as the thickness of the second support is present on top of the first end of the second support,
wherein a straight edge of the right trapezoidal prism is aligned with an upper edge of the first end of the second support such that the casing edge and the upper edge of the second support are flush, and an angled edge of the right trapezoidal prism shape is pointed towards the second end of the second support along the upper edge of the second support.

2. The T-shaped parking device of claim 1, wherein the camera is configured to capture an image of a license plate of a vehicle,
wherein the processor includes circuitry configured with instructions to identify and record a license plate number.

3. The T-shaped parking device of claim 2, wherein the parking device includes circuitry configured with instructions to wirelessly send the license plate number to a user device.

4. The parking device of claim 1, wherein the LiDAR sensor is configured to detect a distance between a vehicle and the parking device
wherein the processor includes circuitry configured with instructions to identify an angle and a distance from the vehicle to the parking device at which the vehicle is parked and determine if the angle and/or the distance is within a set parameter.

5. The parking device of claim 4, wherein the processing circuitry is configured with instructions to activate the lamp/LED if the angle and/or the distance is outside the set parameter.

6. The parking device of claim 4, wherein the processing circuitry is configured with instructions to activate the sound device if the angle and/or the distance is outside the set parameter.

7. The parking device of claim 4, wherein the processor includes circuitry configured with instructions to send an alert if the angle and/or the distance is outside the set parameter.

8. The parking device of claim 1, wherein the wireless communication node comprises:
a radio component; and
a wi-fi component.

9. The parking device of claim 8, wherein the radio component is configured to send information between two or more microprocessors within the same parking device.

10. The parking device of claim 1, wherein the wireless communication node connects to a user interface on a mobile device,
wherein the processor includes circuitry configured with instructions to send parking information to an application on a mobile device.

11. The parking device of claim 10, wherein the application on a mobile device displays vacancy and/or occupancy of a parking spot.

12. The parking device of claim 10, wherein the application on a mobile device displays parking violations.

13. A method of reserving a parking spot, comprising:
accessing the application on a mobile device,
selecting a parking spot and clicking reserve,
sending the reservation to the parking device of claim 10.

14. The parking device of claim 10, wherein the user interface displays whether a parking spot is occupied or vacant.

15. The parking device of claim 1, wherein the back side of the T-shape contains, a camera at its center and a LiDAR sensor at each end.

16. The parking device of claim 15, wherein the parking device can monitor up to two cars simultaneously.

17. The parking device of claim 1, wherein the second support contains an antenna.

18. The parking device of claim 1, wherein the second support contains a microprocessor.

* * * * *